Patented Sept. 6, 1938

2,128,945

UNITED STATES PATENT OFFICE 2,128,945

RUBBER COMPOSITION AND METHOD OF PRESERVING RUBBER

Webster N. Jones, Pittsburgh, Pa., assignor to The B. F. Goodrich Company, New York, N. Y., a corporation of New York No Drawing. Original application January 22, 1931, Serial No. 510,514. Divided and this application August 11, 1936, Serial No. 95,428

8 Claims. (Cl. 18—50)

This invention relates to the art of rubber manufacture, and particularly to the preparation of rubber compositions which resist deterioration due to aging or exposure to the atmosphere. It has long been known that such deterioration can be greatly retarded by treating the rubber either before or after vulcanization with certain substances known as age-resisters or anti-oxidants. The chief object of this invention, then, is to provide a new and superior class of antioxidants for rubber.

The substances which are employed as antioxidants according to this invention are all aromatic amines containing more than two amino groups, of which at least two are tertiary amino groups, and none are primary amino groups, which means that the others are either secondary or tertiary amino groups, and preferably secondary amino groups. The compounds in which the tertiary amino groups are attached both to aliphatic and aromatic groups give excellent results, but in any event each amino group should be an aromatic amino group, that is, should be directly connected to at least one aromatic nucleus. The presence of either strongly basic or acidic groupings is undesirable, hence the compound, aside from the amino groups mentioned above, should consist wholly of hydrocarbon groups, that is, groups or radicals consisting solely of carbon and hydrogen. Compounds in which the amino groups form part of a ring structure are likewise excluded, for heterocyclic nitrogen atoms do not react in the same manner as ordinary amino nitrogens, nor exhibit the peculiar properties which make the compounds of this invention so valuable.

For example, the following symmetrically substituted compounds such as tetramethyl diamino diphenyl ethylene diamine, tetramethyl diamino diphenyl dimethyl ethylene diamine, tetramethyl diamino diphenylamine, and even compounds in which the amino groups are arranged in a branched chain such as octamethyl tetramino tetraphenyl ethylene, are typical members of the class of substances outlined above. It will be understood, however, that similar unsymmetrical compounds may likewise be employed with good effect.

Any one or a mixture of several of the above-enumerated compounds or of other equivalent compounds falling within the same class may be incorporated into rubber with good effect on its age-resisting properties. For example, from ¼ to 5% of such an antioxidant may be mixed with the rubber before vulcanization, the antioxidant having substantially no accelerating effect and therefore ordinarily not necessitating an adjustment of vulcanizing conditions. Alternatively the antioxidant may be applied to the surface of crude or vulcanized rubber, say in the form of a powder, paste or solution. Rubber so treated resists the deteriorating influence of age and exposure to the elements far better than similar untreated rubber.

As a specific example of one embodiment of the method of this invention, a typical tire tread composition was prepared containing: blended plantation rubbers approximately 100 parts by weight, sulfur 5.5 parts, zinc oxide 30 parts, gas black 40 parts, mineral rubber 10 parts, palm oil 5 parts, and hexamethylene tetramine 0.75 part, as well as 0.95 part (½% of the weight of the composition) of octamethyl tetramino tetraphenyl ethylene:

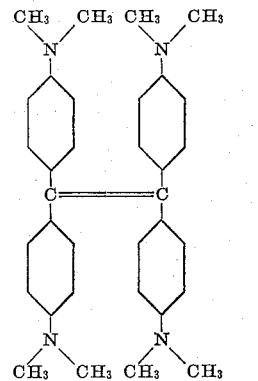

After thorough mixing the composition was vulcanized in a mold for 45 minutes at 145° C. (294° F.) to produce an optimum cure. After accelerated aging for two days in the Bierer-Davis bomb at 70° C. (158° F.) in an atmosphere of oxygen at 300 pounds per square inch pressure, the composition had lost less than half its original strength, whereas the same composition without the octamethyl tetramino tetraphenyl ethylene lost well over three fourths of its original strength.

It is evident from this example that rubber compositions containing even small proportions of the antioxidants of this invention resist deterioration far more effectively than similar untreated compositions. Similar results are attained by substituting any of the other compounds enumerated above, such as tetramethyl diamino diphenyl ethylene diamine:

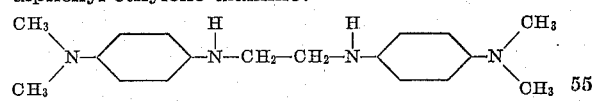

Obviously, the practice of this invention is not limited to the specific composition given above, such composition being merely illustrative of one manner of employing the antioxidants of this invention. The antioxidants may be employed in conjunction with other known antioxidants or with other vulcanizing agents or accelerators than those here specifically disclosed. The proportions of the constituents may be varied, or other substances may be substituted generally therefor, since this invention is applicable to pure rubber or rubber compositions of the most varied nature.

It is to be understood that the term "treating" as employed in the appended claims is used in a generic sense to include either the incorporation of the antioxidants into the rubber by milling or similar process, or their addition to the rubber latex before its coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers, and like products, whether or not admixed with fillers, pigments, vulcanizing or accelerating agents.

This application is a division of my copending application Serial No. 510,514 filed January 22, 1931, now Patent No. 2,072,596, which in turn is a continuation in part of my application Serial No. 213,223 filed August 15, 1927, now Patent No. 1,942,012, which discloses the use as an antioxidant in rubber of the product of the reaction of p-amino dimethylaniline with ethylene dichloride or ethylene dibromide, which product is identical with the tetramethyl diamino diphenyl ethylene diamine hereinabove recited.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a compound consisting of hydrocarbon groups united by from three to four aromatic amino groups of which at least two are tertiary amino groups and none are primary amino groups.

2. The method of preserving rubber which comprises treating rubber with octamethyl tetramino tetraphenyl ethylene.

3. The method of preserving rubber which comprises treating rubber with tetramethyl diamino diphenyl ethylene diamine.

4. The method of preserving rubber which comprises treating rubber with tetramethyl diamino diphenylamine.

5. A rubber composition comprising rubber and a compound consisting of hydrocarbon groups united by from three to four aromatic amino groups of which at least two are tertiary amino groups and none are primary amino groups.

6. A rubber composition comprising rubber and octamethyl tetramino tetraphenyl ethylene.

7. A rubber composition comprising rubber and tetramethyl diamino diphenyl ethylene diamine.

8. A rubber composition comprising rubber and tetramethyl diamino diphenylamine.

WEBSTER N. JONES.